United States Patent Office 2,944,989
Patented July 12, 1960

2,944,989

ACETONE-FORMALDEHYDE-GLYCOL RESINS AND BLENDS WITH OTHER POLYMERS

Mortimer T. Harvey, South Orange, and Peter L. Rosamilia, Newark, N.J., assignors to Harvel Research Corporation, a corporation of New Jersey No Drawing. Filed June 8, 1956, Ser. No. 590,112

5 Claims. (Cl. 260—3)

This invention relates to novel compositions of matter and to methods for producing them and also to novel products in which one or more of said compositions is a component thereof. In one of its more specific aspects, the invention is directed to novel products produced by combining Product (I) water-soluble organic reaction products produced by reacting acetone and formaldehyde under alkaline conditions with Product (II) an alkylene glycol or polyalkylene glycol which is at least 50% soluble in water at 20° C.

Examples of specific Products (II) are ethylene glycol, liquid polyethylene glycols having average molecular weights of 200–600, solid or wax-like polyethylene glycols known on the market as "Carbowax" and having average molecular weights of 1,000–6,000, diethylene glycol, triethylene glycol, thiodiglycol, propylene glycol, dipropylene glycol, pentanediol-2, 4,2-ethylhexanediol-1,3, hexanediol-2,5-butanediol-1, 3,2-methyl pentanediol-2, 4,2-ethoxymethyl-2, 4-dimethyl pentanediol-1, 5,2-methoxymethyl-2, 4-dimethyl pentanediol-1,5, polypropylene glycols of average molecular weight up to about 425, methoxy propylene glycols of average molecular weight up to about 750.

Products (I) are normally liquid and water-soluble in at least twice their weight of water to clear solution, and are produced by reacting under alkaline conditions acetone and formaldehyde in the mole ratio of 1 of acetone to about 2–6 of formaldehyde and may be in either the thickened or unthickened condition. Products (I) are capable of being converted to the infusible state when a mixture thereof together with 5% by weight of lime is maintained at 300° F., for 16 hours. Products (I) have viscosities such that an 80% aqueous solution thereof have viscosities at 25° C. of at least 300 centipoises and no greater than about 20,000 centipoises.

Such Products (I) preferably employed in the practice of this invention are those which are at least trimeric or such that a 100-gram sample thereof when maintained at 150° C. under reduced pressure of 40 mm. of mercury pressure a residue is formed, said residue being undistillable under said temperature and pressure conditions and measuring at least 60% by weight of said sample.

According to this invention, one or a combination of two or more of said Products (I) is combined in any suitable manner with one or a combination of two or more of said Products (II) with the ratio by weight of Product (I) to Product (II) being 1–10 parts of Product (I) to 1 part of Product (II) to provide novel Products (III). Product (I) may be combined with Product (II) in any convenient manner, for example, by mixing and, if desired, after mixing, the mixture is maintained at a temperature from about 200° F. to any desired elevated temperature for any period of time desired depending upon the products desired and also sometimes on the uses to which they are to be put. In general, it is preferred that such mixtures be maintained at about 220°–400° F. for from one-quarter to twenty-four hours or until the mix has thickened to such a degree that its viscosity at 25° C.

is at least 10 times that of the original mix. When maintained in said elevated temperature range, a reaction takes place and apparently is a copolymerization of Products (I) and (II) to provide novel Products (III). The degree or extent of reaction may be controlled by varying the time and temperature to provide a wide variety of useful products. By controlling the time and temperature of reactions, resinous compositions in the intermediate as well as in the final infusible state may be produced. The Products (III) so produced may vary from liquids to solids and may be employed either alone or with various rubbery materials (IV) to improve their resistance to solvents such as turpentine, toluol, acetone, naphtha and all petroleum oils. The rubbery materials (IV) with which one or a combination of two or more of Products (III) may be combined are rubbery polymers of butadiene, rubbery polymers of chloroprene, rubbery copolymers of butadiene and styrene, rubbery copolymers of butadiene and acrylonitrile, and natural rubber. Products (III) may also be combined with vinyl compounds (V) such as polyvinyl alcohol, normally solid polyvinyl chloride, polyvinyl acetate, copolymers of vinyl acetate and vinyl chloride. When combined with either (IV) or (V) alone or together, Product (III) preferably is produced by heating a mixture of (I) and (II) until its viscosity at 25° C. is at least 10 times that of the mixture.

The following Examples A, B and C are given merely by way of illustrating the method for producing acetone-formaldehyde resinous reaction products.

Example A 300 lbs. of acetone together with 1700 lbs. of formaldehyde (37% concentration in water) were changed into an autoclave unit with the steam on and the stirring equipment in operation to raise the temperature of the mix to approximately 120° F. In a separate container there was made up an aqueous solution of caustic soda consisting of 25 lbs. NaOH and 60 lbs. water. This solution was divided into four equal portions. The first portion of caustic soda solution was added and the steam cut off. The temperature of the mix rises to 130° F. and the cold water is turned on as an exothermic reaction takes place and the temperature slowly rises to 200° F., then slowly begins to fall; the second portion of caustic soda solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool to 145° F. at which time the cold water is shut off. Vacuum is turned on keeping the vent of the autoclave open. The vent is slowly closed and the steam turned on. Dehydration may be continued at about 150° F. to produce a resin solution of 75–100% resin. The amount of resin produced measured more than 75% of the combined weights of the acetone and formaldehyde in the original charge. The resin, hereinafter known as Product IA, is amber colored, is thermosetting and is stable for at least six months at 30° C., can be converted to the infusible state in two hours at 140° C., gels at room temperature within four hours upon addition of 10% lime.

Example B

Employing the same procedure as described in Example A, there was produced water soluble resin, known as Product IB by using the following: 290 lbs. of acetone, 1270 lbs. of 37% aqueous solution of formaldehyde, 17 lbs. of sodium hydroxide and 34 lbs. of water.

While in the aforesaid Examples A and B there has been described the method for producing said resinous reaction products with the ratio of acetone to formaldehyde being 1–4 and 1–3, it is understood, of course, that the same method may be employed and the ratio of acetone and formaldehyde may be varied within the limits hereinabove set forth, to produce a variety of reaction products all of which, of course, are water soluble and thermosetting and serve as components of this invention. In addition, these various reaction products, such as Products IA and IB, may be thickened to the desired viscosity, if desired. A method that may be employed for this purpose is to heat Product IA or IB under mild alkaline conditions. In general, Product IA or IB may be in aqueous solution 75–85% to which is added a mild alkali such as sodium acetate, sodium sulphite, etc., and the mix is heated at 250° C. until the viscosity of the resin therein is such that when 4 parts thereof are dissolved in 1 part of water, the viscosity of that solution is of any desired value but no greater than 20,000 centipoises at 25° C.

The following is a specific example for thickening these Products IA or IB:

Example C 250 lbs. of an 80% aqueous solution of Product IA or IB is mixed with an aqueous solution consisting of 7 lbs. of sodium sulphite dissolved in a small amount of water. The mix is heated to approximately 250° C. and held at that temperature until a sample of 4 parts of the resin is dissolved in 1 part of water and has a viscosity of any desired value at 25° C. up to 20,000 centipoises and such thickened products are hereinafter known as Product IC.

The following are illustrative examples of some of the various products of this invention, all parts being given by weight, unless otherwise specified.

Example 1

16 lbs., 11 oz. of an 80% aqueous solution of Product 1A of Product 1B and 4 lbs., 8 oz. of polyethylene glycol having an average molecular weight of approximately 400 were mixed together. The mix was heated to and maintained at 130° C. until heavy body and a sample cooled to room temperature was substantially dry to the touch. Then the mass is immediately poured into shallow pans and cooled to room temperature. The resultant product, known as Product IIA, is a rubbery or gummy mass which upon further heating at 130° C. may be converted to the infusible state.

Example 2

Employing the same Products 1A and 1B in the proportions set forth and procedure defined in Example 1, except that the heating is discontinued after heavy string body and before a sample thereof on cooling is substantially dry. The mass is cooled in shallow pans to room temperature and is a tacky, wet to touch gummy mass, known as Product 21A. This Product 21A either before or after cooling may have a quantity of water, alcohol or water-alcohol added and mixed therewith, to provide a substantially uniform solution.

Example 3

Follow Example 1 except employ 22.5 lbs. of an 80% aqueous solution of Product IA to produce Product 3IA.

Example 4

Follow Example 1, except employ polyethylene glycol having an average molecular weight of approximately 6,000 to produce Product 4IA.

Example 5

Follow the procedure of Example 1, but employ 12.5 lbs. of an 80% aqueous solution of Product IA and 1 lb. of diethylene glycol to produce Product 5IA.

Example 6

Follow the procedure of Example 2, but employ 12.5 lbs. of an 80% aqueous solution of Product IA and 10 lbs. of polypropylene glycol having an average molecular weight of approximately 300 to produce Product 6IA.

Example 7

Follow the procedure of Example 2, and employ 12.5 lbs. of an 80% aqueous solution of Product IC and 2 lbs. of polyethylene glycol having average molecular weight of 300 to produce Product 7IC.

Of course, if desired, the time of heating in Examples 3–5 may be reduced so that the end products thereof on cooling, like in Example 2, are thick masses exhibiting cold flow and such products may, like that of Example 2, be made up into substantially uniform solutions with water, alcohol or water-alcohol.

Instead of employing the particular Products I, such as IA, IB or IC, together with the particular Products II of Examples 1–7, any of the other Products I and II may be copolymerized and the extent of copolymerization of thickening may be controlled to provide a wide variety of products.

All of the Products III of this invention may be combined with one or a combination of two or more of said rubbery Materials IV by milling or any other convenient manner and they may be combined with Products V. In combining Products III with Materials IV, there may be employed 5–200 parts of Product III to 100 parts of Material IV.

The following are illustrative examples of some of the combinations of Products III and IV which are produced all parts being given by weight unless otherwise specified.

Example 8

100 parts of "Hycar OR–25" (rubbery copolymer of butadiene and acrylonitrile)
100 parts of Product 1IA
5 parts of Zinc oxide
1.5 parts of Sulphur
1.5 parts of "Captex" (mercaptobenzothiazole)

The aforesaid components were milled together on a cool rubber mill until the mass was substantially uniform throughout, and was thereafter sheeted, extruded or otherwise formed and molded, and subsequently cured for a period of approximately 45 minutes at 250° F. to provide cured finished articles of manufacture.

Example 9

Employing the same formulation and procedure as that set forth in Example 8, except that an additional component, namely 10 parts of ethyl ether of cardanol, was added as a component of the formulation.

Example 10

100 parts of "Perbunan 35" (copolymer of butadiene and acrylonitrile)
100 parts of Product 1IA
5 parts of Zinc oxide
4 parts of Sulphur
1.5 parts of Stearic acid
25 parts of Carbon black
4 parts of "Altax" (benzothiazyldisulphide)

Employ the same procedure as that set forth in Example 8, and cure the stock for 1 hour at 250–275° F.

Example 11

75 parts of "Perbunan 35" (copolymer of butadiene and acrylonitrile)
25 parts of Product 1IA
50 parts of Carbon
7 parts of Zinc oxide
5 parts of Sulphur
2 parts of "Altax" (benzothiazyldisulphide)

Employ the same procedure as that set forth in Example 8, and, if desired, Product 1IA may be slightly moistened with water and then added directly to the Perbunan broken down on the mill. Each ingredient, of course, being blended individually on the mill in the desired sequence. The stock, after it was made up into a uniform mass, was sheeted, extruded, shaped and molded and cured under pressure for approximately 20 minutes at 300° F. The cured products showed tensile strength of 2308 lbs. per sq. in., elongation of 130%, and Shore hardness (A) of 89.

*Example 12*

75 parts of "Neoprene" (polymer of chloroprene)
100 parts of Product IIA
50 parts Carbon black
4 parts Magnesium carbonate
5 parts Zinc oxide
2 parts "Neozine D" (phenyl beta naphthylamine)

The aforesaid ingredients were milled on a cool rubber mill and, if desired, Product IIA may be first moistened and then added directly to the "Neoprene" broken down on the mill. Each ingredient was blended and broken down individually. The stock may be extruded, molded and formed, and thereafter cured under pressure for one hour at about 225° F. The cured stock was tested and found to have tensile strength of 1250 lbs. per sq. in., elongation of 160% and Shore hardness (A) of 88.

*Example 13*

100 parts "GRS" (copolymer of butadiene and styrene)
100 parts of Product IIA
5 parts of Zinc oxide
20 parts of Carbon black
7 parts of Sulphur
2 parts of "Altax" (benzothiazyldisulphide)

Using the same procedure as that set forth in Example 8, the stock is cured for approximately one hour at 250° F. The cured stock when tested was found to have tensile strength of 560 lbs. per sq. in., elongation of 670% and Shore hardness (A) of 69–73.

*Example 14*

Instead of employing Product IIA in Examples 8–13, there may be substituted therefor in each of said examples, other Products III, for example any of Products 2IA–7IC shown herein and, as a matter of fact, any other of those Products III produced by heating Products I and II in the proportions heretofore set forth to the thickened state which may vary from a liquid to a solid in the intermediate state.

All of the cured end products of Examples 8–14 were characterized by improved oil and solvent resistance and find application as sealing rings for cans, oil proof gaskets, hose, printing rolls, printing blankets, etc.

If desired, any of said Products III, such as those specifically illustrated in Examples 1–7, may be loaded with a filler such as asbestos fibers or the like, with or without rubbery Material IV, and such mixtures may be sheeted, formed and cured to provide oil pump gaskets and packings having remarkable resistance to petroleum, aromatic and ketone solvents. Products III may be mixed with various other fillers, such as talc, silene, barytes or the like sheeted or otherwise made up into convenient thickness, cured, then cut out in the form of discs and employed as bottle caps, oil can sealers, bottle cap liners, etc., where resistance to solvents, acids or oils is required.

Still another procedure which may be followed in accordance with this invention is to provide a solution and by solution we mean a true solution or dispersion of Product III. This, in general, may be accomplished by vigorously agitating said Product III in water, alcohol or water-alcohol, when Product III is produced by heating as in Examples 1–7 and the products thereof are, while hot and before cooling, combined and vigorously mixed with the water, alcohol or water-alcohol. When such solutions are to be formed, it is preferable to stop the heating before a sample on cooling is dry to the touch, and has a viscosity at least 10 times that of the mix of I and II but has cold flow. The water, alcohol or water-alcohol is added thereto in amount measuring about 1 part thereof to 3–4 parts of said Product III. The mix is vigorously agitated to provide a substantially uniform solution which may be used alone for coating a base or may be combined with various emulsions of Product IV or Products V and such novel emulsions may also be used for coating a base. The quantity of the uniform solutions of Product III combined with emulsions of Product IV or Product V may vary over wide limits depending on the characteristics desired in the ultimate end product, however, in practice it is such that the ratio by weight of Product III to Product IV or Product V in the combination is in the range of 5–100 to 2–1.

The following are illustrative examples of such combinations, all parts given by weight unless otherwise specified.

*Example 15*

100 parts of a uniform solution of 80 parts of Product 2IA in 18 parts of water and 2 parts of alcohol is added to 300 parts of a 30% aqueous solution of any one or a combination of two or more of said Products V. The mass is agitated by means of a stirrer until homogeneous throughout and is ready for coating on to a base such as paper, fabric or the like, then heated to drive off the water and alcohol, and cured.

*Example 16*

Follow the same procedure as Example 15, except that emulsions or latices of the various Materials IV may be substituted for V.

*Example 17*

Follow the same procedure as Example 15, and employ solutions of any of the Products III which exhibit cold flow and employ any one of the available emulsions of Products IV or V alone or together to provide a wide variety of novel compositions.

These modified emulsions of Examples 15–17 as well as solvent slurries or solutions of IV and V modified by adding thereto Products III in the above proportions find particular utility as sealers in the can field. Such masses may be poured into the sealing grooves of cans, there cured to provide excellent sealing bands which cooperate with the beaded can top to provide improved seals having high oil and solvent resistance.

This application is a continuation-in-part of our copending application Serial No. 293,676 filed June 14, 1952, now abandoned.

Since certain changes may be made in the above compositions of matter and different embodiments of the invention could be made without departing from its scope, it is intended that all matter contained in the above description shall be interpreted as illustrative and not in a limiting sense.

Having thus described our invention, what we claim is:

1. A novel composition of matter comprising a thickened product produced by heating a mixture of (I) normally liquid acetoneformaldehyde resinous organic reaction product, said product being water soluble, capable of being converted to the infusible state when a mixture thereof and 5% by weight of lime is maintained at 300° F. for 16 hours, and of such viscosity that an 80% aqueous solution thereof has a viscosity at 25° C. of at least 300 centipoises and no greater than 20,000 centipoises, and (II) a polyalkylene glycol whose average molecular weight is in the range of 200 to 6,000 and which is at least 50% soluble in water at 20° C., the ratio by weight of (I) to (II) in said mixture being 1–10 parts of (I) to 1 part of (II), said heating being continued until the viscosity of said mixture at 25° C. is at least 10 times that of said mixture at 25° C. before heating said (I) being further characterized in that a 100-gram sample thereof when maintained at 150 degrees C. under reduced pressure of 40 mm. of mercury pressure, a residue is formed and said residue being undistillable under said temperature and pressure conditions and measuring at least 60% by weight of said sample.

2. A composition defined in claim 1, with Product (II) being polyethylene glycol having an average molecular weight of about 400.

3. A composition defined in claim 1, with Product (II) being polyethylene glycol having an average molecular weight of approximately 1,000–6,000.

4. A composition defined in claim 1, with Product (II) being polyethylene glycol having an average molecular weight of 250–1000.

5. A composition defined in claim 1 combined with a material selected from the group consisting of rubbery homopolymers of butadiene, rubbery polymers of chloroprene, rubbery copolymers of butadiene and styrene, rubbery copolymers of butadiene and acrylonitrile, natural rubber, polyvinyl alcohol, polyvinyl chloride, polyvinyl acetate and copolymers of vinyl chloride and vinyl acetate.

References Cited in the file of this patent

UNITED STATES PATENTS

| | | |
|---|---|---|
| 1,716,542 | Ellis | June 11, 1929 |
| 2,366,970 | Kroeger et al. | Jan. 9, 1945 |
| 2,576,735 | Vogelsang | Nov. 27, 1951 |
| 2,629,703 | Vogelsang | Feb. 24, 1953 |
| 2,699,431 | Harvey et al. | Jan. 11, 1955 |

FOREIGN PATENTS

| | | |
|---|---|---|
| 419,604 | Great Britain | Nov. 13, 1954 |